United States Patent Office 3,402,740
Patented Sept. 24, 1968

3,402,740
VALVE MECHANISM IN A JOINT FOR PASSING A FLUID UNDER ELEVATED PRESSURE
Pierre Perolo, Blaye, France, assignor to Etablissements J. Perolo & Cie, S.A., Blaye, France, a French company
Filed Jan. 12, 1966, Ser. No. 520,275
Claims priority, application France, Jan. 14, 1965, 1,943
8 Claims. (Cl. 137—630.14)

The present invention relates to a valve mechanism in a joint for stopping a fluid flowing under an elevated pressure from an upstream joint part to a downstream joint part.

It is an object of this invention to permit a fluid-tight check valve member mounted inside the joint to be opened against the elevated pressure of the fluid with relatively little effort by means of a control element for opening and closing the valve mechanism.

It is another object to provide a joint between detachable flexible or rigid piping sections, the valve mechanisms being arranged inside the joint without incurring the risk of fluid under pressure escaping to the atmosphere or into the ambient surroundings, and without permitting air to enter into the piping when the piping sections are detached.

The valve mechanism of the invention, which is mounted between an upstream joint part containing and receiving a fluid under elevated pressure, and an empty downstream joint part, permits opening of a pivotal flap valve member held closed under this elevated pressure, without sudden shock.

Joints of this general type and including a valve mechanism operable by a control element from the outside have been fully described, for instance, in my copending application Ser. No. 496,006, filed Oct. 14, 1965, and this disclosure is herewith made part of the present description, as far as pertinent to the present invention, to avoid redundancy.

In general, opening the flap valve member closed under the high pressure of the fluid in such joints is possible only by exerting a correspondingly high counter-pressure on the control handle operating the flap valve member. Pressure-relief valves for such flap valve members have been proposed but since these valves are subjected to the direct bias of the fluid under elevated pressure, they cannot readily function without being subject to a shock wave upon closing and, while their opening is gradual, it is not easy.

The present invention avoids the above mentioned inconveniences and provides, in a joint with a principal check valve member, which is pivotal into fluid-tight engagement with a downstream joint part opening and which carries a pressure-relief valve, means for opening the check valve member easily and without particular effort even against high pressure holding the check valve member closed.

The valve mechanism is mounted in a joint housing where the fluid is displaced under pressure against the check valve which may be opened with little effort by being coupled to a gate valve member adjacent the pivoted fluid-tight check valve member.

The valve mechanism is constituted essentially by the association of two valve members, i.e. a principal fluid-tight check valve member carrying a pressure-relief valve and a gate valve member coupled thereto on the same pivoting shaft which supports the check valve member, the gate valve member being mounted upstream from the check valve member. The two valve members are so mounted that the opening and closing movement of the valve mechanism takes place in three consecutive phases; for instance, in the opening movement, the first phase is the opening of the pressure-relief valve, the second phase is the opening of the principal check valve member which is entrained by the pressure-relief valve, and the third phase is the opening of the gate valve member entrained by the principal check valve member.

When the gate valve member is closed, it obstructs, without being fluid-tight, the flow of fluid and, the principal check valve member being fluid-tightly closed, the two valve members define a chamber in the joint housing. The pressure in this chamber is identical with the pressure of the fluid in the upstream joint part because the gate valve member does not close the upstream joint part opening fluid-tightly but engages it with play. When the check valve member is opened, its pressure-relief valve opens first because the pressure of the fluid on the downstream surface of the pressure-relief valve, which is counteracted by the bias of a compression spring mounted on the valve, is less than the bias exerted upon the principal check valve member by the fluid pressure on its upstream surface. A pressure decrease is thus caused in the joint housing chamber because the pressure therein cannot be built up sufficiently rapidly, due to the fact that the amount of fluid flowing out of an outlet port in the check valve member, which has now been opened by the pressure-relief valve, is greater than the amount of fluid admitted into the chamber by the play between the gate valve member and the upstream joint opening. Accordingly, the pressure against the fluid-tight check valve member is relieved and, as the opening movement is continued, the check valve member is easily pivoted out of fluid-tight engagement with the opening in the downstream joint part and, during its opening movement, entrains the gate valve member which is then also opened and thus permits free flow of the fluid from the upstream to the downstream joint part.

The closing movement is effected in the reverse order: the gate valve member is first moved into its closing position, followed by the check valve member and the pressure-relief valve. When the gate valve member is in its closed position, it abuts a shoulder in the joint housing, which delimits the closing movement of this valve member.

Such a valve mechanism may be mounted in any joint between piping sections designed to carry fluids or fluidized materials under elevated pressure.

The present invention will be better understood by perusing the following detailed description and the attached drawing wherein.

Figure 1:
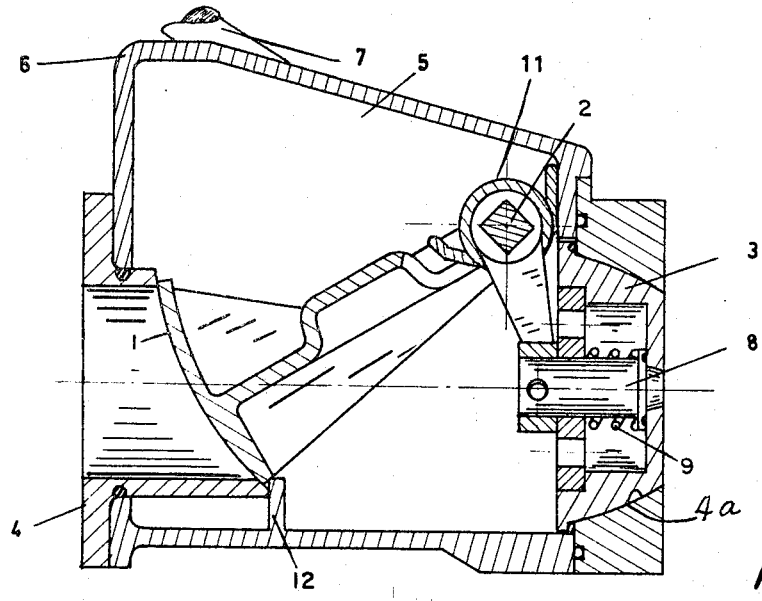
FIG. 1 is a sectional view of a joint with a valve mechanism according to this invention, showing the valve in closed position.
Figure 2:
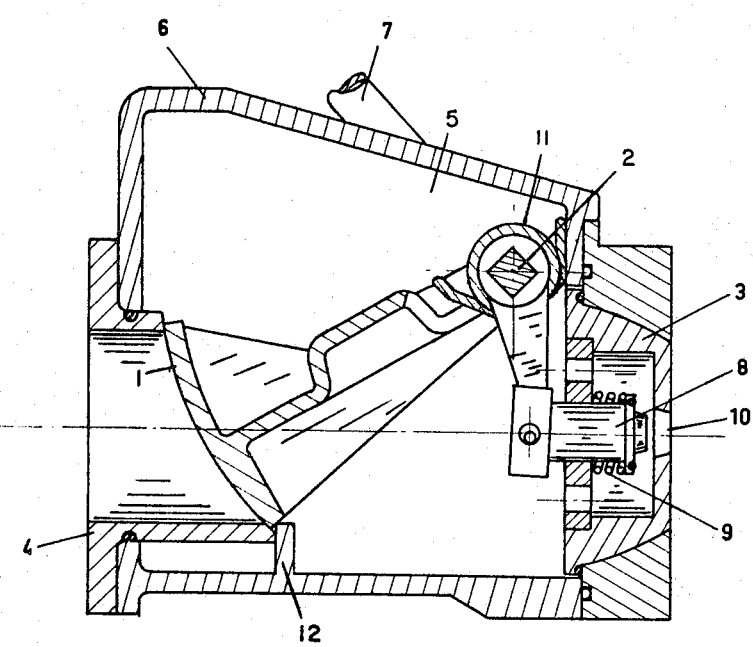
FIG. 2 is the same view, with the pressure-relief valve of the check valve member in opened position.
Figure 3:
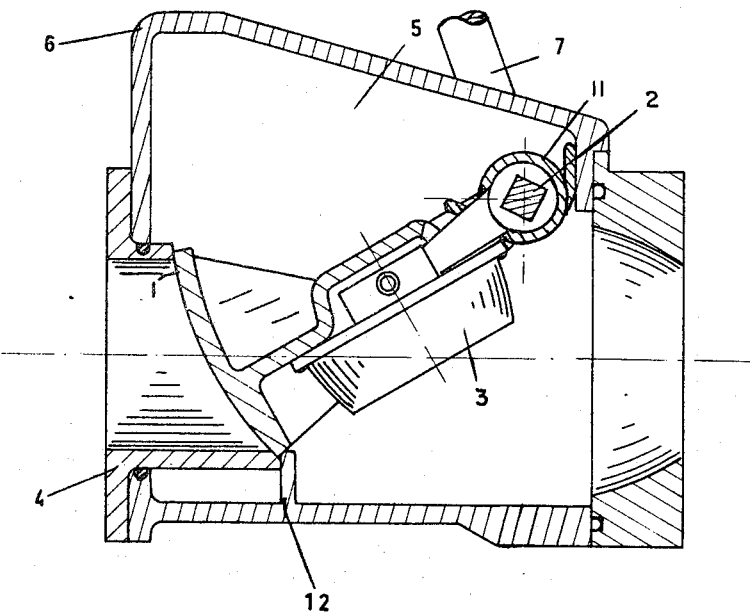
FIG. 3 is the same view, with the check valve member in mid-course of its opening movement.
Figure 4:
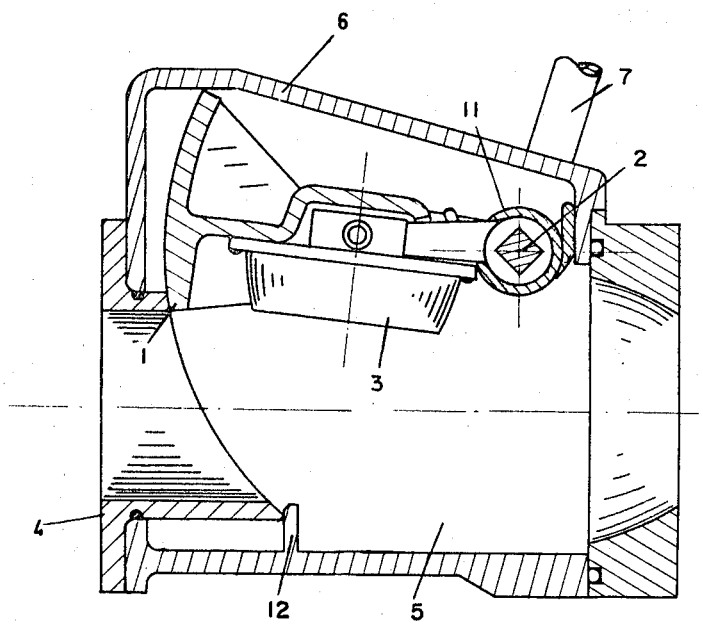
FIG. 4 is the same view, with the gate and check valve members completely open.

In referring to the drawing figures, it will be noted that the gate valve member 1 is freely pivotal about control shaft 2 of the principal check valve member 3 which may be pivoted by rotation of the shaft and provides a fluid-tight seal with an opening in upstream joint part 4a. When valve member 1 is closed, it obstructs fluid flow from upstream joint part 4. If principal, fluid-tight check valve member 3 is closed, a chamber 5 is defined in the joint housing 6 between the two valve members. Due to a play between the interior wall or the valve seat of joint part 4 and the gate valve member 1, the pressure in chamber 5 is equal to that exising in the fluid inlet conduit.

A handle 7 is fixedly connected to shaft 2 and extends outside chamber 5, and an arm 2a is non-rotatably keyed to the shaft and carries the pressure-relief valve. When the handle is pivoted clockwise to rotate shaft 2 and thus to open pivoted valve member 3, the pressure-relief valve 8 is opened first. This opening of the pressure-relief valve takes place because the bias caused by the fluid pressure on the upstream surface of the pressure-relief valve and counteracted by the bias of compression spring 9 is less than the bias exerted upon the total upstream surface of the principal check valve member 3 by the fluid pressure.

Thus, the pressure falls in chamber 5 and cannot be built up sufficiently rapidly in the chamber because the downstream port 10 in the check valve member, which has now been opened by pressure-relief valve 8, discharges a larger amount of fluid than may be admitted into the chamber by the play between the valve seat of joint part 4 and the gate valve member 1.

Since the closing pressure on principal valve member 3 is thus removed, continuing movement of handle 7 permits the pivotal valve member 3 to be opened without difficulty. In mid-course in its opening path, valve member 3 encounters the gate valve member 1 and entrains the same until the entire valve is opened, the spring 11 being tensioned and the fluid flow path through the chamber 5 from downstream joint part 4 to upstream joint part 4a being open.

Closing of the valve is effectuated by torsion spring 11 which biases gate valve member 1 into its maximum closing position where the valve member abuts a shoulder 12 extending inwardly from the joint housing 6 and which stops further downward displacement of the gate valve member. The fluid-tight check valve member 3 is moved into its closing position by pivoting handle 7 counterclockwise, the handle forming part of the control mechanism for opening and closing the valve.

The advantages of the described valve with its coupled valve members, which may be readily disassembled, are readily appreciated from the foregoing description. It will be understood, of course, that the invention is not limited to the specific embodiment described and illustrated, which has been given merely by way of example, and that various changes and modifications may be made without departing from the spirit and scope of his invention.

I claim:
1. A joint comprising
 (1) a downstream joint part;
 (2) an upstream joint part spaced therefrom;
 (3) a joint housing defining a chamber between the joint parts, the housing being fluid-tightly connected between the joint parts and the chamber being capable of communicating with respective openings in the downstream and upstream joint parts, whereby a fluid under pressure may flow from the opening in the upstream joint part through the chamber and into the opening in the downsream joint part; and
 (4) valve means for opening and closing said openings, said means including
  (a) a principal check valve member mounted for fluid-tight engagement with the downstream joint part opening in a closing position,
  (b) a pressure-relief valve movably mounted in the check valve member for fluid-tight engagement with an outlet port in the check valve member in a closing position, the outlet port being in communication with the downstream joint part,
  (c) a gate valve member mounted with play in respect of the upstream joint part opening in a closing position, whereby some fluid under pressure may pass into the chamber past the gate valve member in said closing position,
  (d) a common pivoting shaft supporting the check and gate valve members for pivoting movement of said valve members from the closing positions into opening positions, and
  (e) operating means for rotating the shaft to effectuate the pivoting movement.

2. The joint of claim 1, wherein the check valve member defines a recess in communication with the chamber and said outlet port, the pressure-relief valve extends through the recess, and a support arm non-rotatably keyed to the pivoting shaft is connected to the pressure-relief valve, whereby rotation of the shaft in one direction moves the pressure-relief valve into an opening position out of engagement with the outlet port and against the fluid pressure in the chamber, causing the fluid under pressure to flow from the chamber into the recess and through the outlet port to cause decompression in said chamber.

3. The joint of claim 2, wherein the check valve member has a wall wherein the pressure-relief valve is movably mounted and the pressure-relief valve has a shoulder adjacent the outlet port, and a compression spring biasing the pressure-relief valve into the fluid-tight engagement with the outlet port is mounted on the pressure-relief valve between the check valve member wall and the valve shoulder.

4. The joint of claim 1, wherein the check valve member, the pressure-relief valve and the gate valve member are so coupled together that rotation of the shaft by the operating means in one direction first opens the pressure-relief valve, the pressure-relief valve then entrains the check valve member and disengages it from the downstream joint opening, and the check valve member finally entrains the gate valve member and disengages it from the upstream joint part opening.

5. The joint of claim 1, further comprising a torsion spring biasing the gate valve member into the closing position, said spring being tensioned when the gate valve member is pivoted out of engagement with the upstream joint part opening.

6. The joint of claim 1, wherein the play of the gate valve member in respect of the joint part opening is so correlated with the size of the outlet port that less of said fluid under pressure passes into the chamber in the closing position of the gate valve member than flows out of the outlet port when the pressure-relief valve is out of engagement therewith.

7. The joint of claim 1, wherein the operating means comprises a control handle keyed to the shaft and extending outside the valve body.

8. The joint of claim 1, wherein the gate valve member is mounted on the pivoting shaft for free pivotal movement thereon.

References Cited
UNITED STATES PATENTS

| | | | |
|---|---|---|---|
| 1,417,165 | 5/1922 | Grieshaber | 137—614.11 X |
| 1,850,094 | 3/1932 | Dean | 137—630.14 X |
| 2,642,086 | 6/1953 | Conklin | 137—614.11 X |
| 2,688,341 | 9/1954 | McBain | 137—630.14 |
| 3,136,338 | 6/1964 | Hamer | 137—630.14 |

CLARENCE R. GORDON, *Primary Examiner.*